United States Patent
Ramadoss et al.

(10) Patent No.: US 9,482,285 B2
(45) Date of Patent: Nov. 1, 2016

(54) HYBRID TORQUE TRANSMISSION MECHANISM

(71) Applicant: Johnson Electric S.A., Murten (CH)

(72) Inventors: Mohanlal Allan Ramadoss, Hong Kong (CN); Waito Li, Hong Kong (CN); Yuefu Zhu, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 61 days.

(21) Appl. No.: 14/201,597

(22) Filed: Mar. 7, 2014

(65) Prior Publication Data

US 2014/0270921 A1 Sep. 18, 2014

(30) Foreign Application Priority Data

Mar. 12, 2013 (CN) .......................... 2013 1 0078291

(51) Int. Cl.
*F16D 1/02* (2006.01)
*F16D 1/027* (2006.01)
*F16D 1/10* (2006.01)

(52) U.S. Cl.
CPC ................ *F16D 1/027* (2013.01); *F16D 1/02* (2013.01); *F16D 1/101* (2013.01); *F16D 2001/102* (2013.01); *F16D 2001/103* (2013.01); *Y10T 29/49826* (2015.01); *Y10T 403/472* (2015.01); *Y10T 403/70* (2015.01)

(58) Field of Classification Search
CPC .......... F16D 1/02; F16D 1/027; F16D 1/068; F16D 1/101; F16D 2001/102; F16H 57/0018; F16H 57/0025; F16H 57/0031
See application file for complete search history.

(56) References Cited

U.S. PATENT DOCUMENTS

| | | | | |
|---|---|---|---|---|
| 4,006,993 A | * | 2/1977 | Woerlee | 403/359.5 |
| 5,468,193 A | * | 11/1995 | Yamaguchi | 475/162 |
| 6,136,265 A | * | 10/2000 | Gay | 419/35 |
| 2001/0011848 A1 | * | 8/2001 | Yamamura | 310/68 B |
| 2004/0035000 A1 | * | 2/2004 | Nakajima et al. | 29/894.3 |
| 2004/0226170 A1 | * | 11/2004 | Prucher | 29/893 |

FOREIGN PATENT DOCUMENTS

CN 202597497 U 12/2012

* cited by examiner

*Primary Examiner* — Huan Le
(74) *Attorney, Agent, or Firm* — Muncy, Geissler, Olds & Lowe, P.C.

(57) ABSTRACT

A hybrid torque transmission mechanism (10) comprises a torque receiving component (30) and a torque output component (50) connected to each other, so that they are able to rotate synchronously. The torque receiving component (30) is configured to receive power from an electric motor or gearbox (70), which is then transferred to the torque output component (50), which may contain an output gear (58) to transfer power to an application. The torque receiving component (30) is fabricated using powder metallurgy to achieve sufficient tolerance. The torque output component (50) is fabricated using metal injection molding for high toughness.

16 Claims, 11 Drawing Sheets

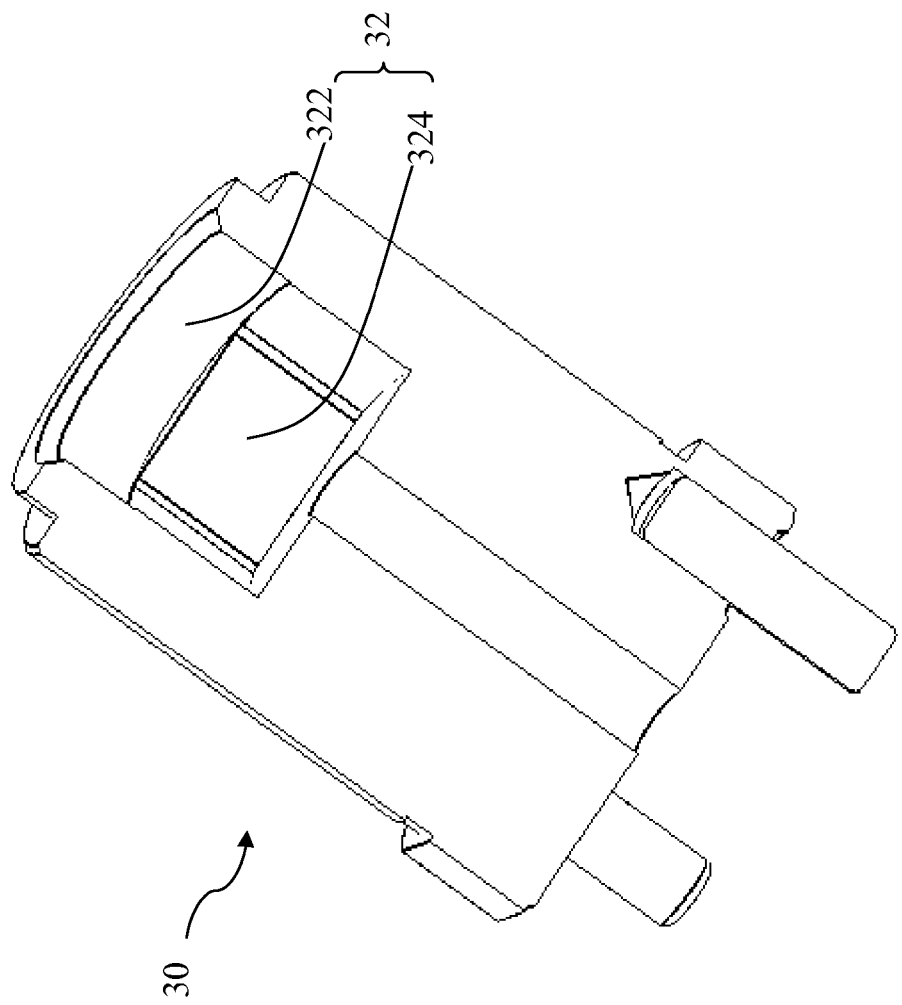

HYBRID TORQUE TRANSMISSION MECHANISM

CROSS REFERENCE TO RELATED APPLICATION(S)

This application claims the benefit of Chinese Patent Application Serial No. 201310078291.1, filed on Mar. 12, 2013. The entire content of the aforementioned patent application is hereby incorporated by reference for all purposes.

BACKGROUND

Torque transmission mechanisms are used in many applications, such as, for example, in electric powered surgical cutters used in the medical field. Typical transmission mechanisms comprise an output gear connected an output end of a gearbox (e.g., a planetary gearbox) or electric motor, allowing for power from the gearbox or motor to be transferred to an application, such as a blade, fan, or wheel. The output gear may contain connection features in order to connect it to the output end of the gearbox, such as one or more connection holes interfacing with one or more corresponding connection columns connected to the output end of the gearbox.

Due to safety considerations, it is desirable for the output gears of torque transmission mechanisms, such as those used in surgical cutters, to have a high degree of toughness, so that they do not shatter or break when subjected to a large impact. In order to achieve the necessary toughness, the output gears may be manufactured using metal injection molding (MIM), as output gears created in this fashion generally exhibit the toughness necessary to withstand large impacts due to having low internal stress.

However, because MIM causes shrinkage during the manufacturing process, it is often difficult to create connection features (e.g., connection holes) having the precise tolerances needed to interface the output gear with the gearbox or motor. Thus these features typically require secondary processing, adding complexity to the manufacturing process and increasing the cost of the output gears.

Alternatively, powder metallurgy (PM) would enable the connection features to have the desirable tolerance precision without requiring secondary processing, thus lowering the cost and complexity of manufacturing. However, output gears manufactured using powder metallurgy are often too brittle, lacking the toughness required in many applications.

Accordingly, there exists a need for a lower-cost torque transmission mechanism with sufficient toughness and sufficient tolerance precision that is simple to manufacture.

SUMMARY

Some embodiments are directed towards a torque transmission mechanism for transferring torque from a motor or gearbox to an application, wherein the mechanism comprises a torque receiving component and a torque output component. The torque receiving component includes a first axial end configured to receive a torque input, and a second axial end having a structural feature. The torque output component includes a first axial end having a structural feature and a second axial end. The structural feature on the first axial end of the torque output component is configured to interface with the structural feature on the second axial end of the torque receiving component, such that the torque receiving component and torque output component are connected and are able to rotate synchronously. In some embodiments, the torque receiving component and torque output component are fabricated separately using different processes. For example, the torque receiving component may be created using powder metallurgy, while the torque output component may be created using metal injection molding.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

FIGS. 3A and 3B illustrate a torque receiving component and a torque output component in accordance with some embodiments.

DETAILED DESCRIPTION

Figure 1A:
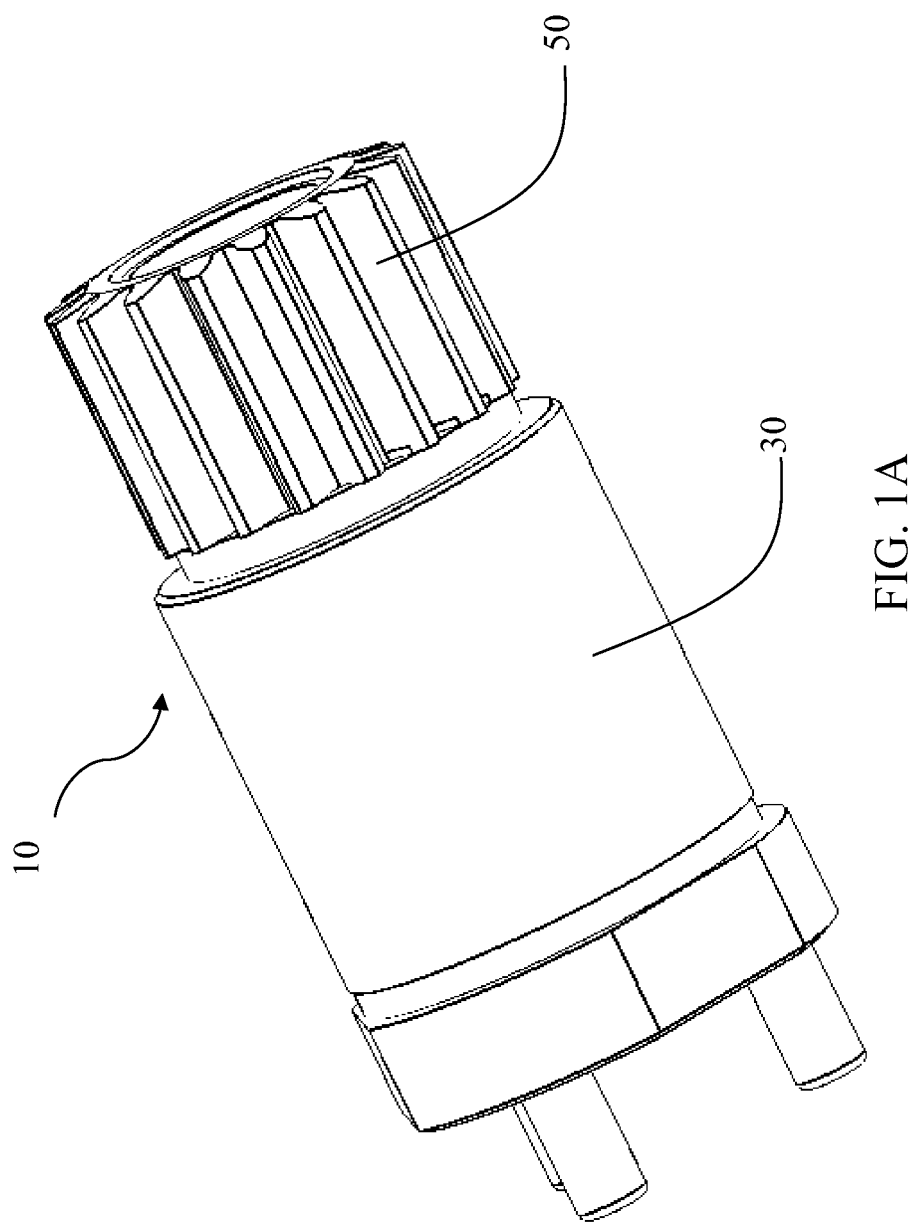
FIGS. 1A and 1B illustrate a torque transmission mechanism in accordance with some embodiments.

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

Figure 1B:
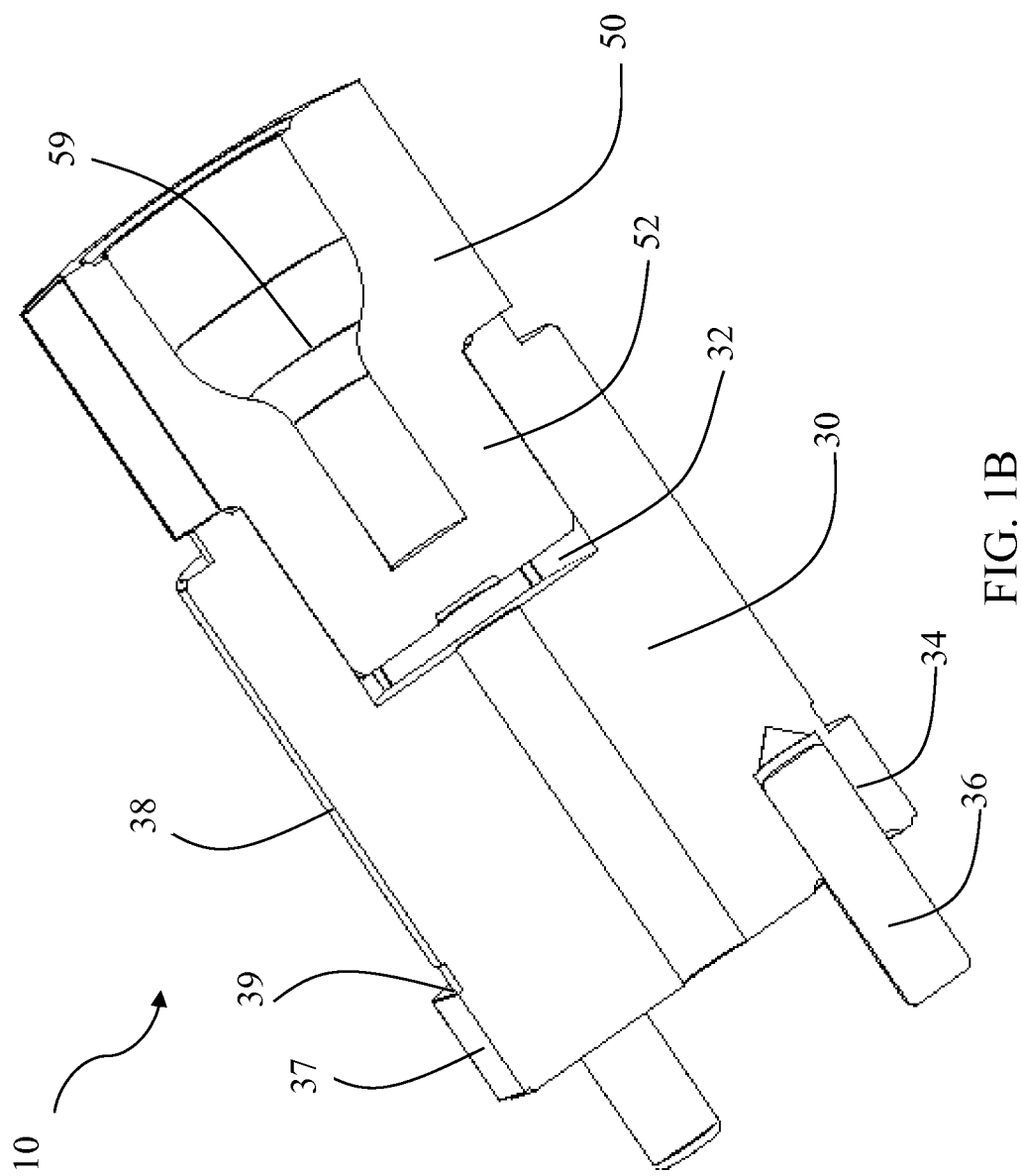

FIGS. 1A and 1B illustrate a hybrid torque transmission mechanism 10 in accordance with some embodiments. Torque transmission mechanism 10 comprises a torque receiving component 30 and a torque output component 50, which may be detachably connected to each other so that torque output component 50 is able to rotate synchronously with torque receiving component 30. Preferably, torque output component 50 exhibits a high degree of toughness and torque receiving component 30 exhibits a high degree of tolerance precision. In some embodiments, torque receiving component 30 is formed using powder metallurgy (PM), and torque output component 50 is formed using metal injection molding (MIM).

In some embodiments, torque receiving component 30 and torque output component 50 are connected through a non-cylindrical interface formed between the two components. For example, one of torque receiving component 30 and torque output component 50 may comprise a protrusion having a non-circular cross-section, while the other component comprises a recess having a cross-section matching that of the protrusion, such that the projection may be accommodated within the recess. In the illustrated embodiments, torque output component 50 is illustrated as having a protrusion 52, while torque receiving component 30 contains a corresponding recess 32. However, it will be understood that in other embodiments, torque output component 50 may contain a recess, while torque receiving component 30 contains a corresponding protrusion.

In some embodiments, protrusion 52 is provided with at least one substantially arcuate surface and at least one substantially planar surface. Similarly, recess 32 is configured to have at least one arcuate surface and at least one planar surface corresponding to those on protrusion 52, so that torque receiving component 30 and torque output component 50 are able to rotate synchronously together. In some embodiments, the at least one planar surface of protrusion 52 and the at least one planar surface of recess 32 are configured to interface with a loose fit for easy assembly. The at least one planar surface of protrusion 52 and the at least one planar surface of recess 32 may be configured to interface with a tight fit (e.g., abutting each other), to prevent detachment of torque receiving component 30 from torque output component 50 when protrusion 52 is fixed within recess 32.

Figure 2A:
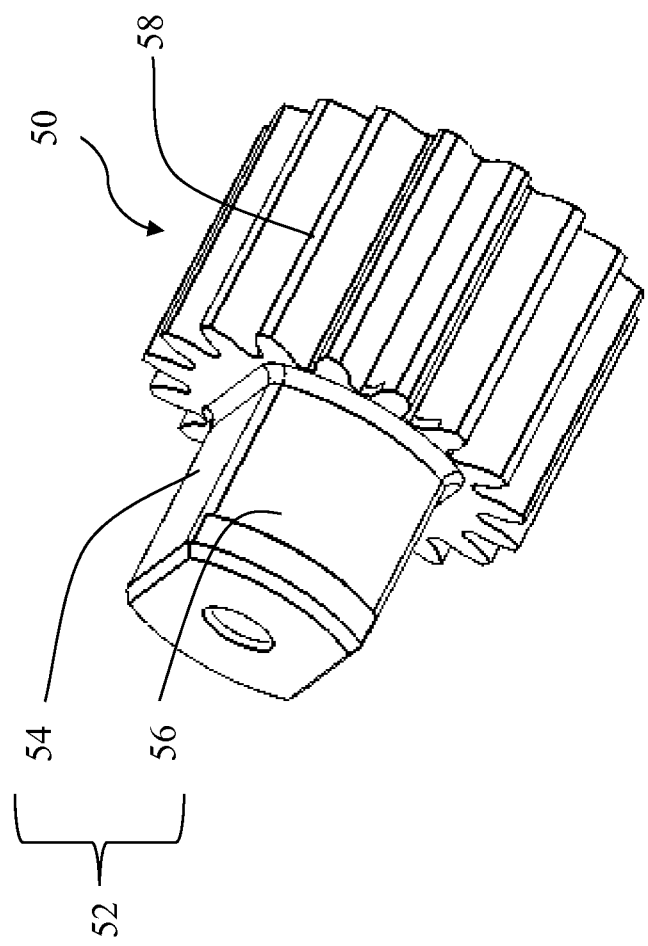
FIGS. 2A-2D illustrate torque output components used in torque transmission mechanisms in accordance with some embodiments.

In accordance with a preferred embodiment, torque output component 50 contains protrusion 52 having two substantially parallel planar surfaces 54 connected by two arcuate surfaces 56, as illustrated in FIG. 2A. It should be understood that the term "substantially," such as in "substantially parallel" or "substantially planar," is used herein to indicate certain features, can refer to either an exact feature (e.g., perfectly parallel, perfectly planar) or a feature that is slightly offset or otherwise not perfect (e.g., slightly offset from being perfectly parallel, slightly offset from being perfectly planar). Such offsets may be caused by the fabrication and manufacturing tolerances, slacks in various mating components or assemblies, wear and tear, or any combinations thereof may nonetheless cause some deviations from an exact feature. Therefore, one of ordinary skill in the art will clearly understand that the term "substantially" such as in "substantially parallel" or "substantially planar" is used here to incorporate at least such fabrication and manufacturing tolerances, the slacks in various mating components or assemblies, or any combinations thereof.

Torque receiving component 30 comprises a corresponding recess 32. The shape of recess 32 matches that of protrusion 52, so that protrusion 52 is able to be inserted within recess 32, with arcuate surfaces 56 of protrusion 52 interfacing with corresponding arcuate surfaces of recess 32 with a loose fit, and planar surfaces 54 of protrusion 52 interfacing with corresponding planar surfaces of recess 32 with a tight fit.

Figure 2B:
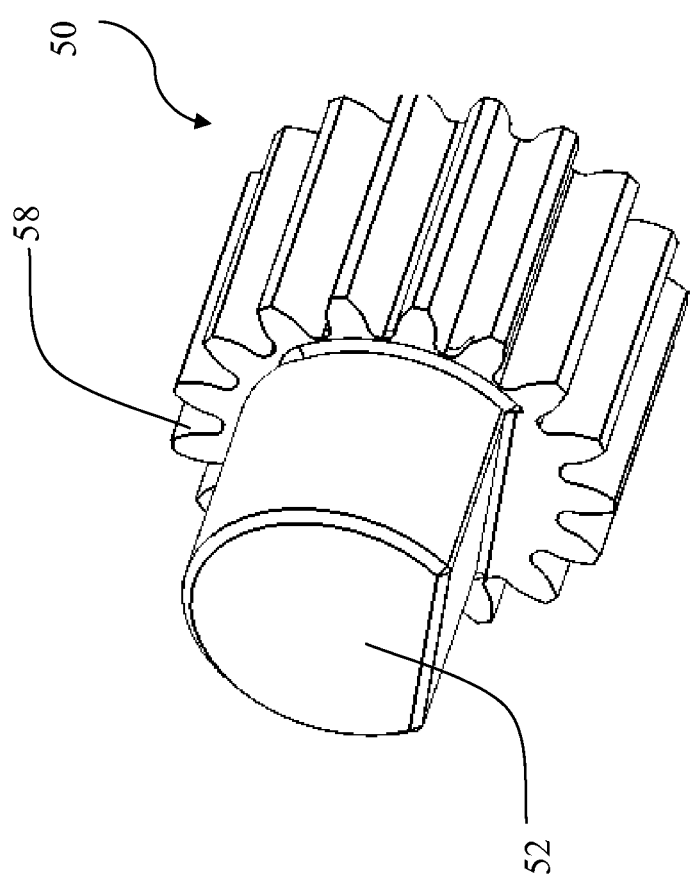
Figure 2D:
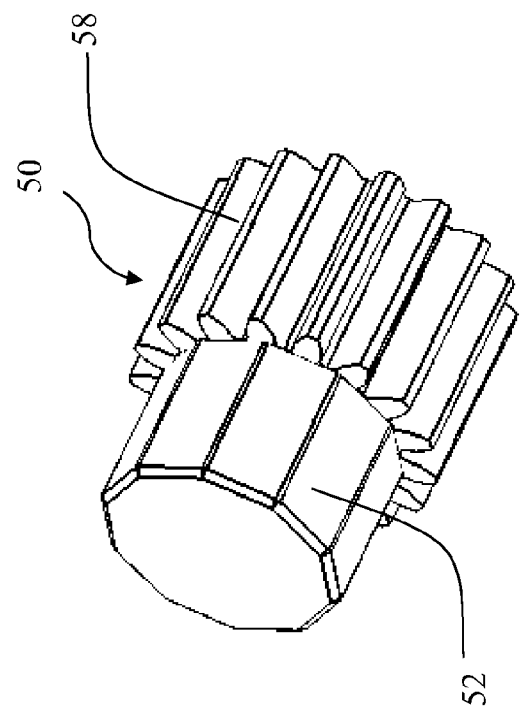
Figure 2C:
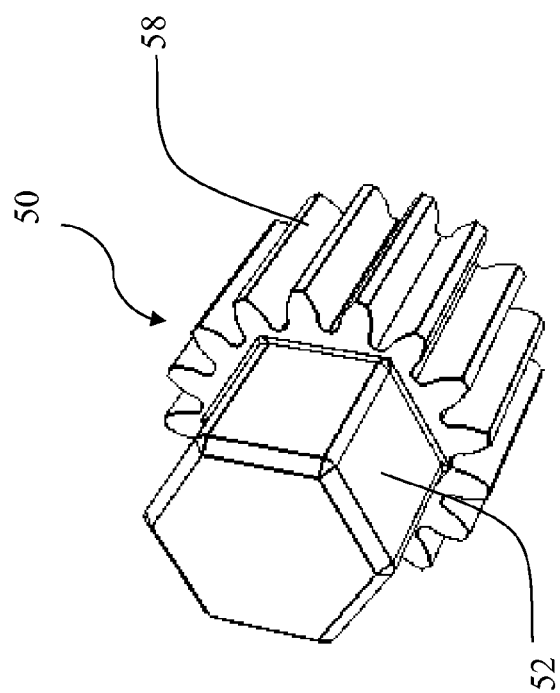

It is understood different protrusion and recess shapes may be used in other embodiments. For example, FIG. 2B illustrates a torque output component 50 wherein protrusion 52 is substantially "D" shaped, having one planar surface and one arcuate surface. In other embodiments, it is understood that protrusion 52 may not be provided with at least one arcuate surface and at least one planar surface. For example, FIG. 2C illustrates a torque output component 50 wherein protrusion 52 is substantially hexagonal, and FIG. 2D illustrates a torque output component 50 with a substantially polygonal protrusion 52. It will be understood that the illustrated shapes of protrusion 52 of torque output component 50 are not exhaustive, and are merely given for the purpose of example.

In some embodiments, at least a portion of the outer surface of torque output component 50 is provided with a plurality of output teeth forming an output gear 58, allowing for the transfer of torque from the torque transmission mechanism 10 to a gear, rack, or other structure on an external application (e.g., a blade, fan, or other application). In other embodiments, other means of transmitting torque (e.g., a non-circular protrusion like protrusion 52 or a non-circular recess like recess 32 in torque receiving component 30) may be used instead of output gear 58.

Torque output component 50 may further comprise a bore or hole 59 extending in a axial direction thereof, as illustrated in FIG. 1B. Bore 59 functions to reduce the wall thickness of torque output component 50, thereby decreasing the amount of shrinkage experienced during the MIM process to prevent unevenness in shrinkage, and lower material costs. In some embodiments, bore 59 is a blind bore; while in some other embodiments, bore 59 may be a through bore.

Torque receiving component 30 comprises, on an end remote from torque output component 50, a plurality of structural features for interfacing with and receiving power from an output of a power source, such as a motor or a gearbox. In some embodiments as illustrated in FIG. 1B, the structural features comprise one or more connection holes 34 configured to interface with the ends of one or more connection columns 36. The other end of connection columns 36 may be configured to interface with a power source such as, for example, the central axes of planet gears in a planetary gearbox. In a preferred embodiment, connection holes 34 are blind bores.

Figure 3B:
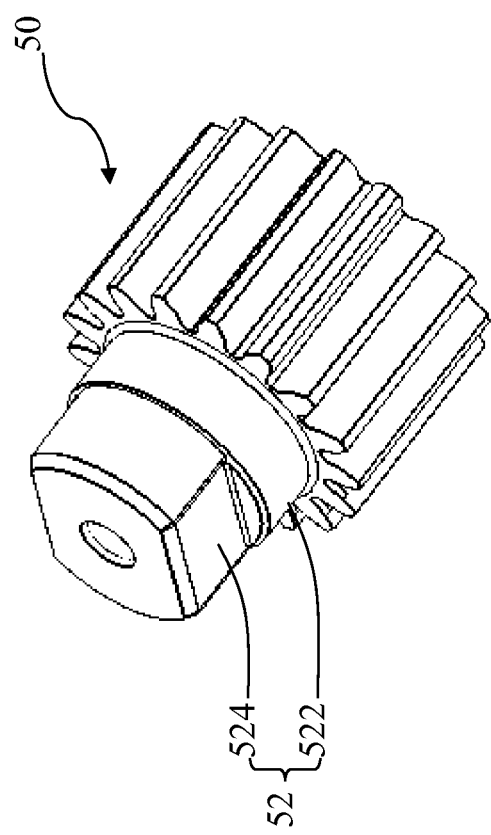

FIGS. 3A and 3B illustrate a torque receiving component 30 and a torque output component 50, respectively, in accordance with another embodiment. In this embodiment, the interface surface between torque receiving component 30 and torque output component 50 comprises substantially cylindrical surfaces and non-cylindrical surfaces. In some embodiments, torque receiving component 30 and torque output component 50 are configured to interface at the cylindrical surfaces with a tight fit, and to interface at the non-cylindrical surfaces with a loose fit.

For example, as illustrated in FIG. 3A, recess 32 of torque receiving component 30 comprises a substantially cylindrical section 322 and a non-cylindrical section 324. Likewise as illustrated in FIG. 3B, protrusion 52 of torque output component 50 comprises two sections, a substantially cylindrical section 522 and a non-cylindrical section 524. In some embodiments, the radius of cylindrical section 522 is configured to be slightly larger than the largest radius of non-cylindrical section 524, wherein the largest radius of second section 524 is defined as the largest distance between a point on the outer surface of non-cylindrical section 524 and the central axis of torque output component 50.

When torque transmission mechanism 10 is assembled, cylindrical section 522 of protrusion 52 interfaces with cylindrical section 322 of recess 32 with a tight fit in order to fix torque receiving component 30 and torque output component 50 together, while non-cylindrical section 524 of protrusion 52 interfaces with non-cylindrical section 324 of recess 32 with a loose fit. Rotation of torque receiving component 30 drives the rotation of torque output component 50; and the two components are able to rotate together.

Figure 4A:
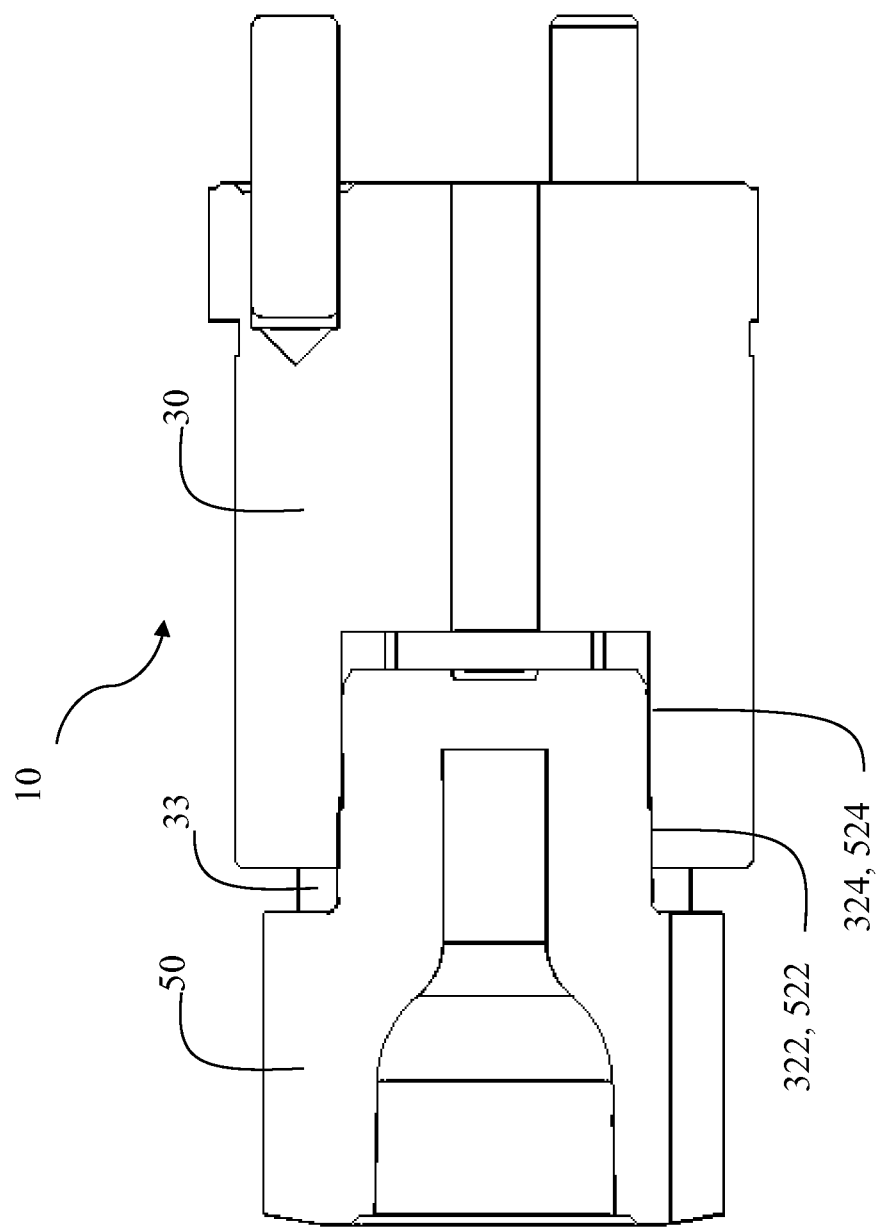
FIGS. 4A and 4B illustrate a torque transmission mechanism and a torque receiving component in accordance with some embodiments
Figure 4B:
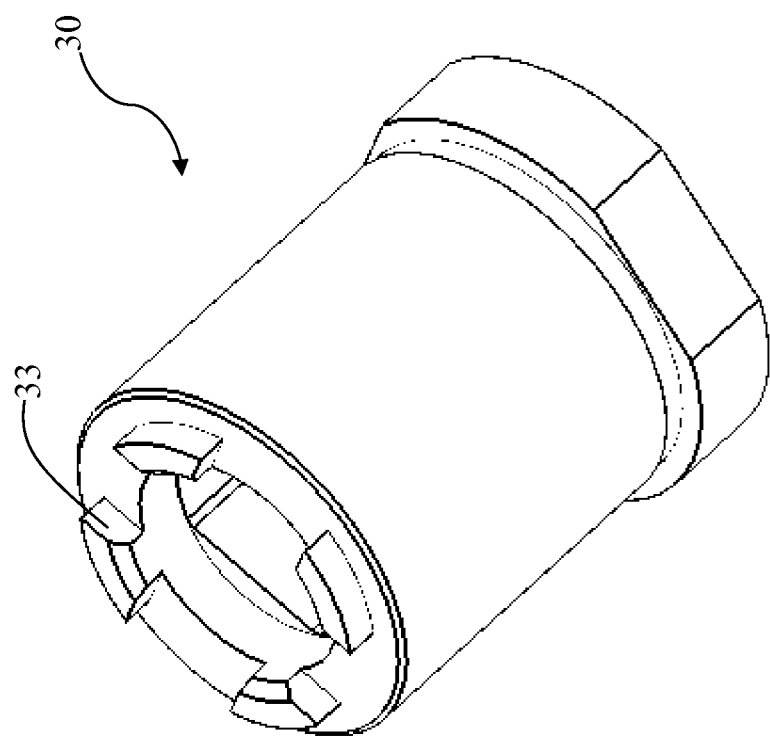

FIGS. 4A and 4B illustrate torque transmission mechanism 10 comprising a torque receiving component 30 and a torque output component 50 connected to each other by welding in accordance with yet another embodiment. For example, as shown in FIG. 4B, torque receiving component 30 may comprise one more protrusions 33 on an end surface adjacent to where component 30 interfaces with torque output component 50. During assembly, protrusions 33 may be laser welded onto an end surface of torque output component 50.

Figure 5:
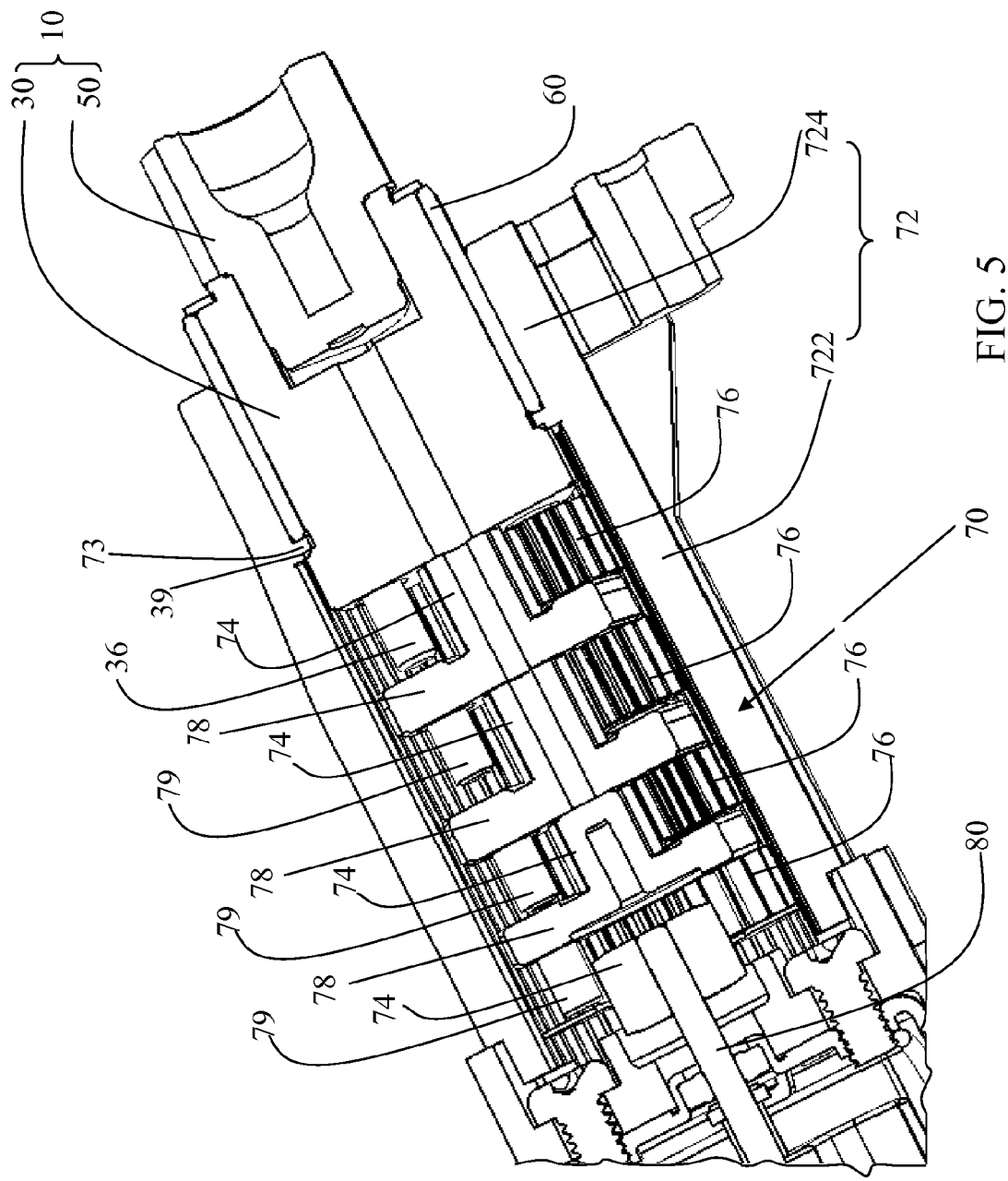
FIG. 5 illustrates a torque transmission mechanism interfacing with a planetary gearbox in accordance with some embodiments.

FIG. 5 illustrates torque transmission mechanism 10 in accordance with some embodiments interfacing with a planetary gearbox 70, which may be used to reduce the rotation speed of a power source, e.g., an electric motor. In some embodiments, planetary gearbox 70 comprises a ring gear 72 housing a plurality of planetary gear stages. Each planetary gear stage comprises a sun gear 74 and a plurality of planet gears 76, wherein planet gears 76 engage sun gear 74 and ring gear 72. For purposes of explanation, the planetary gear stage of gearbox 70 located closest to the power source will be referred to as the first gear stage, and the planetary gear stage located closest to torque transmission mechanism 10 will be referred to as the last gear stage.

In some embodiments, sun gear 74 of the first gear stage may be attached, connected, or otherwise fixed to an output shaft 80 of the power source, e.g., an electric motor, in order to receive power from the power source. A plurality of planet gears 76 of the first gear stage are configured to spin around sun gear 74, and are attached to a surface of a spinning frame 78 through a plurality of rods or columns 79. In some embodiments, columns 79 interface with the central axes of the planet gears 76 (see FIG. 5, wherein a portion of planetary gears 76 is cut away to show columns 79). Sun gear 74 of the next gear stage is attached to the opposite end of spinning frame 78. Thus the rotation of sun gear 74 of a gear stage is transferred to its associated planet gears 76, and to sun gear 74 of a next gear stage through spinning frame 78.

Planet gears 76 of the last gear stage, instead of being coupled to a spinning frame 78, interface with torque receiving component 30 through connection columns 36. For example, in some embodiments the ends of connection columns 36 extending outside connection holes 34 are configured to be inserted into the center holes of the planet gears 76 of the last gear stage of planetary gearbox 70. Thus, power can be transferred from the power source through planetary gearbox 70 to torque receiving component 30 and torque output component 50.

As illustrated in FIG. 5, torque receiving component 30 may be accommodated within an open end of inner gear ring 72 of planetary gearbox 70 remote from output shaft 80 of the power source. In some embodiments, as illustrated in FIG. 1B, torque receiving component 30 comprises a large radius portion 37 and a small radius portion 38, with a step 39 formed there between. Ring gear 72 of planetary gearbox 70 may comprise a protrusion 73 (shown in FIG. 5) corresponding to step 39, which divides ring gear 72 into an engaging portion 722 on the side of ring gear 72 closer to output shaft 80, and an extended portion 724 on the side of ring gear 72 remote from output shaft 80. Step 39 and protrusion 73 may be substantially annular or ring-shaped, wherein the width of step 39 corresponds to the length of protrusion 73. At least a portion of engaging portion 722 comprises a plurality of gear teeth to interface with the planet gears 76 located inside ring gear 72, while extended portion 724 may or may not have gear teeth.

Figure 6:
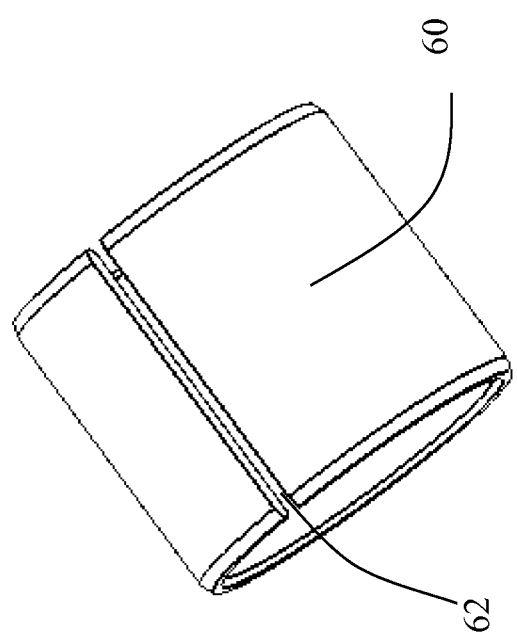
FIG. 6 illustrates a sleeve portion that may be used in accordance with the embodiment illustrated in FIG. 5.

During assembly, a sleeve 60, illustrated in FIG. 6, may be inserted into extending portion 724. Torque receiving component 30 is inserted into ring gear 72 from the end closer to output shaft 80, such that step 39 and protrusion 73 are adjacent or abutting each other, with small radius portion 38 of torque receiving component 30 accommodated inside sleeve 60. The remaining components of planetary gearbox 70 may then be assembled using conventional methods.

Sleeve 60 preferably comprises a wear-resistant material, such as a curled sheet of stainless steel. The sheet ends may be spaced slightly apart such that the circumference of sleeve 60 is not completely closed, forming a longitudinal slot 62. When installing sleeve 60 into extended portion 724 of inner gear ring 72, the surface of sleeve 60 may be elastically deformed, allowing for a tight fit between sleeve 60 and extended portion 724 of gear ring 72. In some embodiments, an inner surface of sleeve 60 may be coated with a wear resistant material such as Teflon. It is understood that while the illustrated embodiment shows the use of a sleeve 60, in other embodiments, a sleeve 60 may not be necessary.

In the present embodiments, torque receiving component 30 is fabricated using powder metallurgy, allowing for connection holes 34 or other connection features to be formed with the required tolerances without the need for secondary processing. This simplifies the manufacturing process while lowering material costs. On the other hand, torque output component 50 is fabricated using metal injection molding, which provides the toughness and the ability to withstand high impacts necessary for output gear 58.

Present embodiments of a torque transmission mechanism may be used in applications requiring a high degree of safety. Embodiments are also suitable for limited or one-time use applications, such as in the drive mechanism for an organ removal knife used in the medical field.

In the foregoing specification, various aspects have been described with reference to specific embodiments thereof. It will, however, be evident that various modifications and changes may be made thereto without departing from the broader spirit and scope of various embodiments described herein. For example, the above-described systems or modules are described with reference to particular arrangements of components. Nonetheless, the ordering of or spatial relations among many of the described components may be changed without affecting the scope or operation or effectiveness of various embodiments described herein. In addition, although particular features have been shown and described, it will be understood that they are not intended to limit the scope of the claims or the scope of other embodiments, and it will be clear to those skilled in the art that various changes and modifications may be made without departing from the scope of various embodiments described herein. The specification and drawings are, accordingly, to be regarded in an illustrative or explanatory rather than restrictive sense. The described embodiments are thus intended to cover alternatives, modifications, and equivalents.

The invention claimed is:

1. A hybrid torque transmission mechanism, comprising:
   a torque receiving component including a first axial end configured to receive a torque input and a second axial end having a structural feature; and
   a torque output component including a first axial end having a structural feature interfacing with the structural feature on the second axial end of the torque receiving component, such that the torque output component and torque receiving component are able to rotate synchronously, and a second axial end,
   wherein the torque output component and torque receiving component are fabricated separately in different processes, and
   wherein the first axial end of the torque receiving component comprises a plurality of holes configured to interface with a plurality of connection columns to receive torque therefrom.

2. The hybrid torque transmission mechanism of claim 1, wherein at least a portion of an outer surface of the torque output component adjacent the second axial end thereof comprises a plurality of gear teeth.

3. The hybrid torque transmission mechanism of claim 1, wherein the torque receiving component and the torque output component are fixedly connected by welding.

4. The hybrid torque transmission mechanism of claim 1, wherein the first axial end of the torque receiving component is connected to a planetary gearbox for receiving the torque input.

5. The hybrid torque transmission mechanism of claim 4, wherein:
   the planetary gearbox comprises a ring gear; and
   a portion of the first axial end of the torque receiving component is configured to fit within the ring gear.

6. The hybrid torque transmission mechanism of claim 5, further comprising a sleeve configured to fit between a portion of the ring gear and the portion of the first axial end of the torque receiving component within the ring gear of the planetary gearbox.

7. The hybrid torque transmission mechanism of claim 1, wherein the torque receiving component is fabricated using powder metallurgy and the torque output component is fabricated using metal injection molding, the torque output component having a higher degree of toughness than the torque receiving component.

8. The hybrid torque transmission mechanism of claim 1, wherein the structural feature on the first axial end of the torque output component and the structural feature on the second axial end of the torque receiving component form a non-cylindrical interface.

9. The hybrid torque transmission mechanism of claim 8, wherein one of the second axial end of the torque receiving component and the first axial end of the torque output component includes a protrusion, and another one includes a recess mating with the protrusion.

10. The hybrid torque transmission mechanism of claim 9, wherein the protrusion has a substantially polygonal cross section.

11. The hybrid torque transmission mechanism of claim 9, wherein:
    the protrusion comprises at least one planar surface and at least one arcuate surface; and
    the recess comprises at least one planar surface interfacing with the at least one planar surface of the protrusion and at least one arcuate surface interfacing with the at least one arcuate surface of the protrusion.

12. The hybrid torque transmission mechanism of claim 11, wherein the protrusion comprises two substantially parallel planar surfaces connected by two substantially arcuate surfaces.

13. The hybrid torque transmission mechanism of claim 11, wherein:
    the at least one planar surface of the protrusion is configured to interface with at the least one planar surface of the recess with a loose fit; and
    the at least one arcuate surface of the protrusion is configured to interface with the at least one arcuate surface of the recess with a tight fit.

14. The hybrid torque transmission mechanism of claim 11, wherein the protrusion comprises a substantially cylindrical portion and a non-cylindrical portion.

15. A hybrid torque transmission mechanism, comprising:
    a torque receiving component including a first axial end configured to receive a input and a second axial end having a structural feature; and
    a torque output component including a first axial end having a structural feature interfacing with the structural feature on the second axial end of the torque receiving component, such that the torque output component and torque receiving component are able to rotate synchronously, and a second axial end,
    wherein the torque output component and torque receiving component are fabricated separately in different processes;
    wherein the first axial end of the torque receiving component is connected to a planetary gearbox for receiving the torque input; and
    wherein the first axial end of the torque receiving component comprises a plurality of blind holes configured to interface with a plurality of connection columns of the planetary gearbox.

16. A hybrid torque transmission mechanism, comprising:
    a torque receiving component including a first axial end configured to receive a torque input and a second axial end having a structural feature; and
    a torque output component including a first axial end having a structural feature interfacing with the structural feature on the second axial end of the torque receiving component, such that the torque output component and torque receiving component are able to rotate synchronously, and a second axial end,
    wherein the torque output component and torque receiving component are fabricated separately in different processes;
    wherein the first axial end of the torque receiving component is connected to a planetary gearbox for receiving the torque input;
    wherein the planetary gearbox comprises a ring gear; and a portion of the first axial end of the torque receiving component is configured to fit within the ring gear;
    wherein the planetary gearbox further comprises a sleeve configured to fit between a portion of the ring gear and the portion of the first axial end of the torque receiving component within the ring gear of the planetary gearbox; and
    wherein the sleeve is a curled sheet of steel and comprises a longitudinal slot, such that the sleeve is able to deform elastically when inserted into the ring gear of the planetary gearbox.

* * * * *